(12) United States Patent
Liu et al.

(10) Patent No.: US 10,719,960 B2
(45) Date of Patent: Jul. 21, 2020

(54) RECONSTRUCTING IMAGE

(71) Applicant: Shanghai Neusoft Medical Technology Co., Ltd., Shanghai (CN)

(72) Inventors: Shaolian Liu, Shenyang (CN); Jie Chang, Shenyang (CN); Ming Li, Shenyang (CN)

(73) Assignee: Shanghai Neusoft Medical Technology Co., Ltd., Shanghai (CN)

( * ) Notice: Subject to any disclaimer, the term of this patent is extended or adjusted under 35 U.S.C. 154(b) by 150 days.

(21) Appl. No.: 15/960,923

(22) Filed: Apr. 24, 2018

(65) Prior Publication Data

US 2018/0308261 A1    Oct. 25, 2018

(30) Foreign Application Priority Data

Apr. 24, 2017 (CN) .......................... 2017 1 0270179
Apr. 20, 2018 (CN) .......................... 2018 1 0362644

(51) Int. Cl.
 *G06T 11/00* (2006.01)
 *G06T 5/40* (2006.01)
 *G06T 7/00* (2017.01)

(52) U.S. Cl.
 CPC .............. *G06T 11/003* (2013.01); *G06T 5/40* (2013.01); *G06T 7/0012* (2013.01); *G06T 2207/10104* (2013.01)

(58) Field of Classification Search
 None
 See application file for complete search history.

(56) References Cited

U.S. PATENT DOCUMENTS

| | | | | |
|---|---|---|---|---|
| 5,900,636 A | * | 5/1999 | Nellemann | G01T 1/1611 250/363.03 |
| 9,606,245 B1 | * | 3/2017 | Czarnecki | G01T 1/2006 |
| 2003/0062482 A1 | * | 4/2003 | Williams | G01T 1/17 250/363.03 |
| 2005/0129170 A1 | * | 6/2005 | Watson | G01T 1/2985 378/5 |
| 2005/0205791 A1 | * | 9/2005 | Bryman | G01T 1/172 250/363.03 |
| 2007/0221850 A1 | * | 9/2007 | Panin | G01T 1/1617 250/363.04 |
| 2012/0063658 A1 | * | 3/2012 | Leroux | G06T 11/006 382/131 |

(Continued)

*Primary Examiner* — Kevin Ky
(74) *Attorney, Agent, or Firm* — Fish & Richardson P.C.

(57) ABSTRACT

Methods, devices and apparatus for reconstructing an image are provided. In an aspect, a method includes: obtaining coincidence events detected by crystal pairs in a detector of a PET device by scanning a phantom, reconstructing a phantom image according to the coincidence events, and obtaining a time calibration amount of each of crystals in the detector by determining a crystal based source position deviation and a crystal based source time difference of a crystal pair including the crystal according to the phantom image, determining a time difference of the crystal pair according to respective time differences for the crystal pair detecting a plurality of coincidence events, pre-calibrating the time difference of the crystal pair with the crystal based source time difference, and obtaining the time calibration amount of the crystal according to the pre-calibrated time difference of the crystal pair.

20 Claims, 5 Drawing Sheets

(56) References Cited

U.S. PATENT DOCUMENTS

2014/0158890 A1\* 6/2014 Pistorius ............... G01T 1/1647
250/362
2016/0070008 A1\* 3/2016 Cao .......................... G01T 1/36
378/5

\* cited by examiner

RECONSTRUCTING IMAGE

CROSS REFERENCE TO RELATED APPLICATIONS

This application claims priority to Chinese Patent Applications No. 201710270179.6 filed on Apr. 24, 2017 and 201810362644.3 filed on Apr. 20, 2018, the entire contents of which are incorporated herein by reference.

TECHNICAL FIELD

The present disclosure relates to image reconstruction.

BACKGROUND

Positron Emission Computed Tomography (PET) may be used to display a morphological structure and provide functional information about diseases of visceral organs at a molecular level through in-vivo metabolism, which shows excellent performance in diagnosing tumors, cardiovascular and nervous system diseases, etc. A working principle of a PET device is that: a medicine including radionuclides is injected into a subject, the decay of the radionuclides produces a positron, the positron annihilates with a surrounding negatron and a pair of back-to-back gamma-photons is generated. If the detector of the PET device receives the pair of back-to-back gamma-photons in a given time difference, it means that a coincidence event is detected. An internal image of the subject may be reconstructed based on information of the coincidence event. The detector may include a plurality of scintillation crystals and photomultipliers. Due to some factors such as inconsistency of performance of the plurality of scintillation crystals, the determining accuracy of time when a gamma-photon is detected by each of the plurality of scintillation crystals may be different, thereby affecting PET image reconstruction.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

SUMMARY

The present disclosure provides methods, devices and apparatus for reconstructing image, for example, by calibrating an event collection time of each of a plurality of crystals in a PET detector.

One aspect of the subject matter described in the present disclosure can be embodied in methods that include the actions of obtaining, by scanning a phantom placed in a Positron Emission Computed Tomography (PET) device, coincidence events detected by crystal pairs in a detector of the PET device and respective time differences for the crystal pairs detecting the coincidence events; reconstructing a phantom image according to the coincidence events detected by the crystal pairs; for each crystal in the detector, obtaining a time calibration amount of the crystal by determining a crystal based source position deviation of a crystal pair including the crystal according to the phantom image, where the crystal based source position deviation of the crystal pair represents a distance between a midpoint of a line-of-response corresponding to the crystal pair and a midpoint of an intersecting segment between the line-of-response and the phantom, obtaining a crystal based source time difference of the crystal pair according to the determined crystal based source position deviation of the crystal pair, determining a time difference of the crystal pair according to respective time differences for the crystal pair detecting a plurality of coincidence events, obtaining a pre-calibrated crystal based time difference of the crystal pair by pre-calibrating the time difference of the crystal pair with the crystal based source time difference of the crystal pair, and obtaining the time calibration amount of the crystal according to the pre-calibrated crystal based time difference of the crystal pair. The actions can also include obtaining event collection times of the crystals in the detector by scanning a subject with the PET device, where each of the event collection times represents a time at which a respective crystal of the crystals detects a gamma-photon when the subject is scanned; calibrating the event collection time of each of the crystals based on the time calibration amount of each of the crystals; determining coincidence events of the subject based on the calibrated event collection times of the crystals; and reconstructing an image of the subject based on the determined coincidence events of the subject.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Another aspect of the present disclosure features a Positron Emission Computed Tomography (PET) device including: a detector including a plurality of crystals, where each of the crystals is configured to detect a gamma-photon; at least one processor; and at least one non-transitory machine-readable storage medium coupled to the at least one processor having machine-executable instructions stored thereon that, when executed by the at least one processor, cause the at least one processor to perform the actions of the methods.

The foregoing and other embodiments can each optionally include one or more of the following features, alone or in combination. For example, for each of the crystal pairs, the crystal pair can include two of the crystals in the detector, the crystal pair detecting a coincidence event can indicate that two gamma-photons from a same positron annihilation event are detected by the two crystals, and the time difference of the crystal pair detecting the coincidence event can indicate a difference between a first time at which one of the two crystals detects one of the two gamma-photons and a second time at which the other of the two crystals detects the other of the two gamma-photons.

Pre-calibrating the time difference of the crystal pair with the crystal based source time difference of the crystal pair can include: determining whether an event collection time of the crystal is delayed or not according to the phantom image, and in response to determining that the event collection time of the crystal is delayed, subtracting the crystal based source time difference of the crystal pair from the time difference of the crystal pair.

In some implementations, determining the time difference of the crystal pair according to the respective time differences for the crystal pair detecting the plurality of coincidence events includes: determining a respective count corresponding to each of the respective time differences for the crystal pair detecting the plurality of coincidence events; generating a histogram according to the respective time differences for the crystal pair detecting the plurality of coincidence events and the counts corresponding to the respective time differences, where the respective time differences are represented along a horizontal axis of the histogram, and the counts corresponding to the respective time differences are represented along a vertical axis of the histogram; and determining the time difference of the crystal pair according to one or more peak positions of the histogram.

The actions can further include: determining the one or more peak positions of the histogram by Gaussian function fitting. Determining the time difference of the crystal pair according to one or more peak positions of the histogram can include: determining an average of time differences corresponding to the one or more peak positions of the histogram; and determining the average of time differences as the time difference of the crystal pair.

In some implementations, obtaining the time calibration amount of the crystal includes: determining M number of second crystals that are located in a sector of the detector associated with the crystal to obtain M number of crystal pairs, the crystal being a first crystal in each of the M number of crystal pairs, where M is an integer greater than or equal to 1; setting an initial value of a time calibration amount of the first crystal to be 0; determining a first variable with a first crystal based time difference of each of the M crystal pairs, where an initial value of the first crystal based time difference of each of the M crystal pairs is a pre-calibrated first crystal based time difference of each of the M crystal pairs; determining a second variable with a second crystal based time difference of each of the M crystal pairs, where an initial value of the second crystal based time difference of each of the M crystal pairs is a pre-calibrated second crystal based time difference of each of the M crystal pairs; and iterating the first crystal based time difference of the crystal pair and the time calibration amount of the first crystal based on the first variable and the second variable.

In some cases, determining the first variable with the first crystal based time difference of each of the M crystal pairs includes: determining an average of the first crystal based time differences of the M crystal pairs; and determining a negative of the average of the first crystal based time differences as the first variable.

In some cases, iterating the first crystal based time difference of the crystal pair and the time calibration amount of the first crystal based on the first variable and the second variable includes: determining a difference between the first variable and the second variable that are obtained in an i-th iteration; generating the first crystal based time difference of the crystal pair in the (i+1)-th iteration by obtaining a sum of the difference and the first crystal based time difference of the crystal pair in the i-th iteration; and generating the time calibration amount of the first crystal in the (i+1)-th iteration by obtaining a sum of the first variable and the time calibration amount of the first crystal that are obtained in the i-th iteration.

In some implementations, calibrating the event collection time of the crystal based on the time calibration amount of the crystal includes: generating a time calibration table based on the time calibration amount of each of the crystals in the detector; obtaining the time calibration amount of the crystal by searching the time calibration table; and calibrating the event collection time of the crystal based on the obtained time calibration amount of the crystal. In some implementations, calibrating the event collection time of the crystal based on the time calibration amount of the crystal includes: taking a sum of the event collection time of the crystal and the time calibration amount of the crystal as the calibrated event collection time of the crystal.

The details of one or more examples of the subject matter described in the present disclosure are set forth in the accompanying drawings and description below. Other features, aspects, and advantages of the subject matter will become apparent from the description, the drawings, and the claims. Features of the present disclosure are illustrated by way of example and not limited in the following figures, in which like numerals indicate like elements.

DETAILED DESCRIPTION

Figure 1:
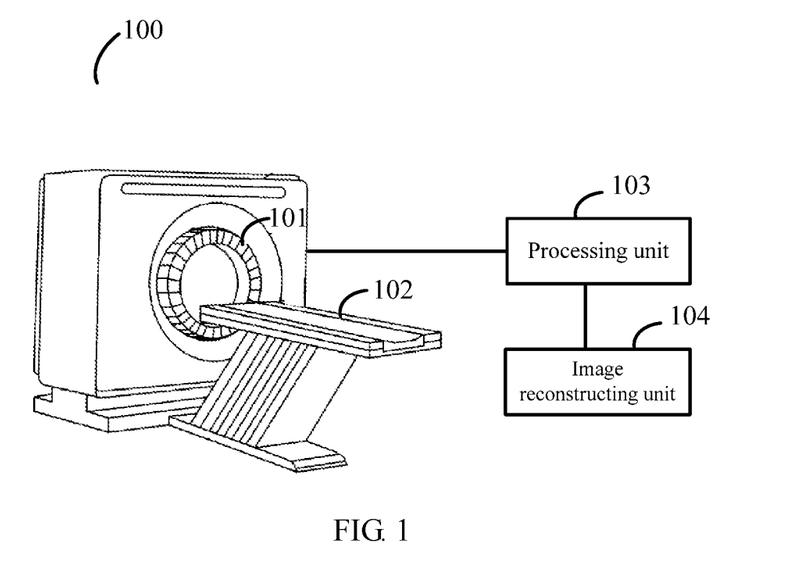
FIG. 1 is a schematic diagram illustrating a structure of a PET device according to an example of the present disclosure.

FIG. 1 is a schematic diagram illustrating a structure of a PET device 100 according to an example. As shown in FIG. 1, the PET device 100 includes a PET detector 101. The PET detector 101 is a ring-shaped detector and includes a plurality of scintillation crystals and photomultipliers. When being scanned, a subject is placed on a scanning bed 102 and brought into the ring-shaped detector 101 through the scanning bed 102.

The subject may be injected with a medicine including radionuclides before being scanned. Decay of the radionuclides may generate a positron. When the positron meets a negatron in the subject, a positron annihilation event may occur. The positron annihilation event may generate a pair of back-to-back gamma-photons. Two gamma-photons derived from a same positron annihilation event may be hereinafter referred to as a photon pair. The gamma-photons may be detected by the scintillation crystals in the detector 101. Detecting a gamma-photon by a crystal may be hereinafter referred to as an event. The photomultiplier may be configured to send information of the event to a processing unit 103. The processing unit 103 may be configured to determine which gamma-photons among the gamma-photons detected by the plurality of scintillation crystals are derived from a same positron annihilation event. In addition, when two gamma-photons derived from the same positron annihilation event are detected by two crystals, it means that a coincidence event is detected and the two crystals may be referred to as a crystal pair. The information of the coincidence event may be sent to an image reconstructing unit 104 for PET image reconstruction.

Each of the plurality of crystals may record time at which an event is detected, i.e., event collection time of the crystal. Due to factors such as inconsistency of performance of each of the plurality of crystals, the determining accuracy of time at which a gamma-photon is detected by each of the plurality of crystals may be different, thereby resulting in inaccurate event collection time of the crystal. However, the event collection time of the crystal is important in information processing of the PET device. Taking Time of flight-PET (to be referred to as TOF-PET hereinafter) as an example, the PET device may estimate an approximate position of a positron annihilation event based on a time difference for the above crystal pair detecting a photon pair, and the position of the positron annihilation event may be then used for reconstructing an image. Therefore, the accuracy of the event collection time of the crystal relates to the accuracy of the estimated position of the positron annihilation event and the quality of the reconstructed image. In view of this, a method of reconstructing an image is provided in the present disclosure to calibrate the event collection time of each of the plurality of crystals in the PET detector.

Calibration for the event collection time of each of the plurality of crystals in the PET detector may be performed before the PET device is formally used. For the calibration, a symmetrical phantom as a radioactive source may be placed in the vicinity of the center of the PET device. The symmetrical phantom may be a solid rod source, a solid cylinder phantom filled with diluted radionuclides, or a cylindrical phantom. When the symmetrical phantom is scanned, the detector 101 of the PET device may detect gamma-photons and obtain coincidence events through information processing. The information of the coincidence events obtained by scanning the phantom may be used to calibrate the event collection time of the crystal.

Figure 2:
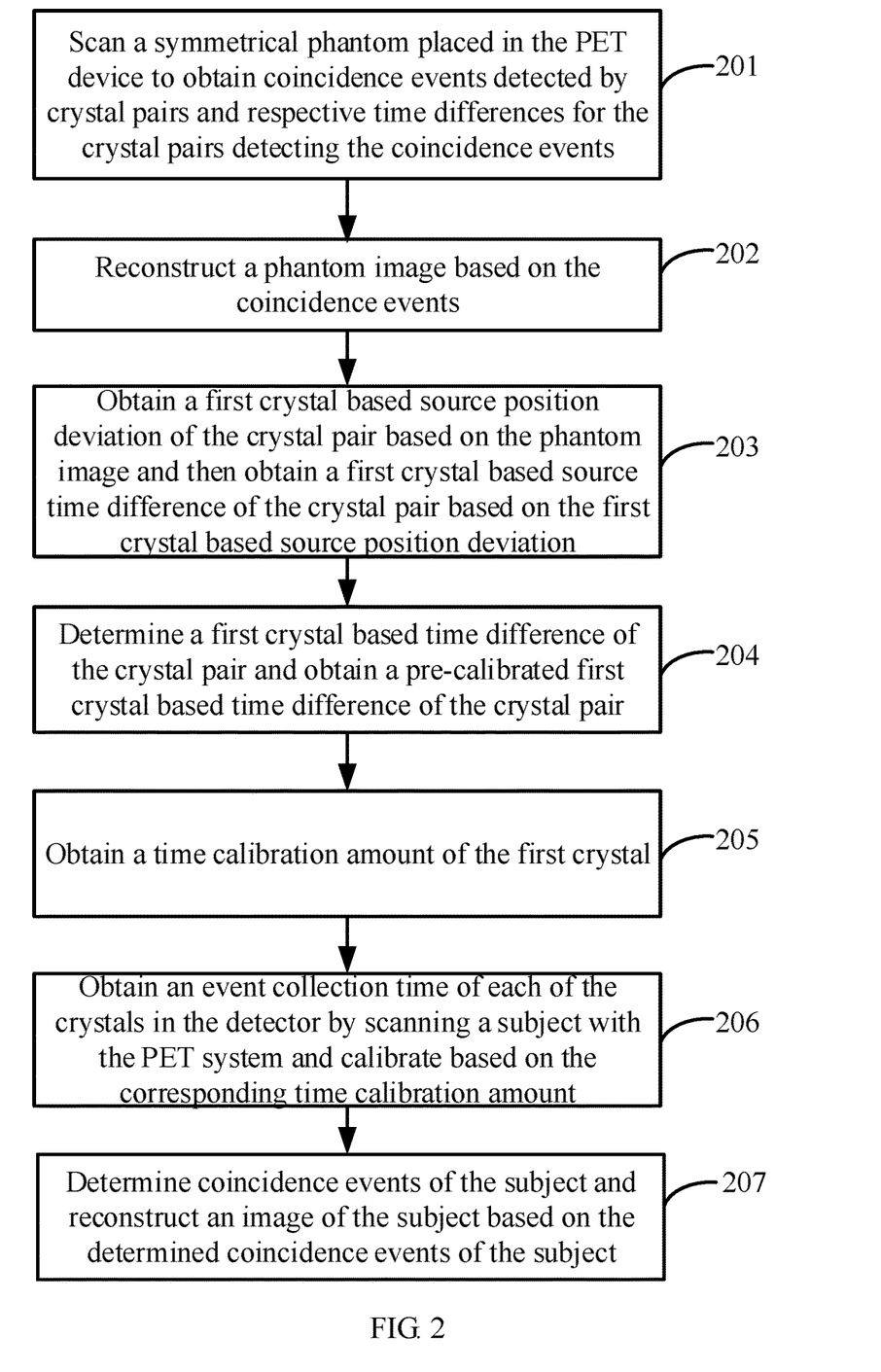
FIG. 2 is a flowchart illustrating a process of a method of reconstructing an image according to an example of the present disclosure.

FIG. 2 is a flowchart illustrating a process of a method of reconstructing an image according to an example of the present disclosure. The process includes the following steps.

At step 201, a symmetrical phantom placed in the PET device is scanned to obtain coincidence events detected by crystal pairs and respective time differences for the crystal pairs detecting the coincidence events.

For example, a coincidence event is detected by a crystal pair including a first crystal A and a second crystal B. Two gamma-photons in the coincidence event are derived from a same positron annihilation event when the phantom is scanned and the two gamma-photons are detected by the first crystal A and the second crystal B, respectively. Assuming that the first crystal A detects a first event at a first time $T_A$ and the second crystal B detects a second event at a second time $T_B$, the time difference $T_A-T_B$ indicates the time difference for the above crystal pair A, B detecting the coincidence event. A difference of event collection times between the two crystals in the crystal pair A, B may also be hereinafter referred to as a time difference for the crystal pair A, B detecting the coincidence event. It is understood that the crystal pair A, B may detect a plurality of coincidence events and for each of the plurality of coincidence events, a respective time difference for the crystal pair A, B detecting the coincident event can be obtained.

At step 202, a phantom image is reconstructed based on the coincidence events.

A phantom image may be reconstructed based on the coincidence events. Further, a central position of the phantom may be calculated based on the reconstructed phantom image. For example, the phantom image is reconstructed with coincidence events obtained by scanning the phantom. The reconstructed phantom image can be smoothed by filtering. A symmetrical center $(x_p, y_p)$ of each layer of the reconstructed phantom image may be obtained by a centroid method. The symmetrical center of each layer of the reconstructed phantom image may indicate a center of the radioactive source phantom in each layer. A calculation formula of the centroid method may be as follows:

$$\begin{cases} x_p = \sum_j x_j I_j \Big/ \sum_j I_j \\ y_p = \sum_j y_j I_j \Big/ \sum_j I_j \end{cases} \quad (1)$$

In the above formula 1, j represents a pixel serial number; $x_j$ represents an x-coordinate corresponding to the pixel j; $y_j$ represents a y-coordinate corresponding to the pixel j; and $I_j$ represents a pixel value corresponding to the pixel j. Finally, the center of each layer of the reconstructed phantom image (to be referred to as image layer hereinafter) may be obtained as $P(x_p, y_p, z_p)$, where $Z_p$ represents a z-coordinate value of the image layer, i.e., a coordinate value of the image layer in an axial direction; $x_p$ represents an x-coordinate of the symmetrical center of the image layer; and $y_p$ is a y-coordinate of the symmetrical center of the image layer.

At step 203, a first crystal based source position deviation of the crystal pair is obtained based on the phantom image, and a first crystal based source time difference of the crystal pair is obtained based on the first crystal based source position deviation of the crystal pair.

In this example, source position deviation is one of reasons that cause a difference of event collection time between two crystals in a crystal pair. If the central position of the phantom exactly coincides with the central position of the PET device, the difference of event collection time caused by the source position deviation can be zero. The difference of event collection time caused by the source position deviation can be calculated at step 203.

Figure 3:
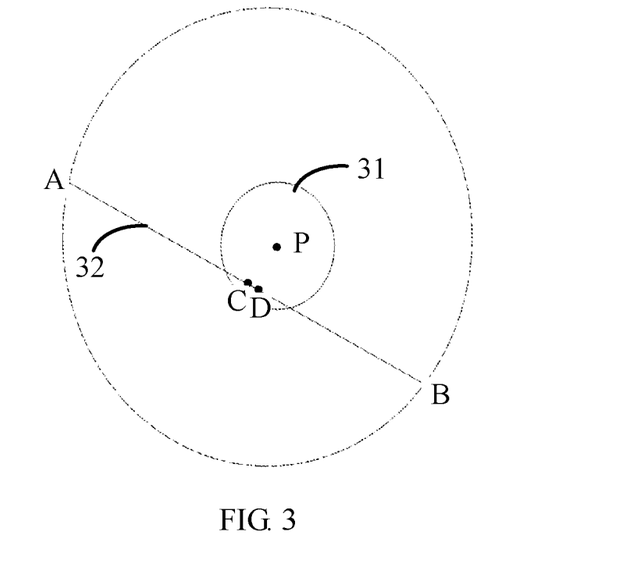
FIG. 3 is a schematic diagram illustrating a position deviation according to an example of the present disclosure.

With reference to FIG. 3, a phantom 31 as the radioactive source is a solid cylinder phantom and the central position of the radioactive source in an image layer is $P(x_p, y_p, z_p)$, where $z_p$ is a central Z-coordinate of the phantom 31 in the axial direction. The first crystal A and the second crystal B are the crystal pair that detects the coincidence event(s). A line connecting the first crystal A and the second crystal B is a line of response (LOR) 32. A point C is a central position of the LOR 32. A point D $(x_D, y_D, z_D)$ is a central point of an intersecting segment between the LOR 32 and the phantom 31.

In an ideal state, if the central position of the phantom exactly coincides with the central position of the PET device, the point D can coincide with the point C, and at this case, the time difference for the crystal pair A, B detecting a coincidence event is zero. However, in the state as shown in FIG. 3, there may be a distance between the point D and the point C, which may cause the time difference for the crystal pair A, B detecting the coincidence event to be non-zero. Since the photons of the coincidence event detected by the crystal pair A, B may be emitted from the intersecting segment between the LOR 32 and the phantom 31, the distance between the point D and the point C may result in a time difference for the first crystal A and the second crystal B detecting the photons of the coincidence event, i.e., a difference of event collection time for the crystal pair A, B caused by the source position deviation, which is also referred to as a source time difference.

At step 203, the distance between the point D and the point C may be calculated first. Considering that an axial deviation of the phantom 31 is relatively minimal within a smaller axial range, the axial deviation of the phantom 31 is assumed to be 0 and the coordinates of the first crystal A and the second crystal B are assumed to be $A(x_A, y_A, z_A)$ and $B(x_B, y_B, z_B)$. Because the point D is on the line AB and at the central point of the intersecting segment of the line AB and the phantom 31, the distance between the first crystal A and the point D (to be referred to as |AD| hereinafter) may be calculated according to the following formula (2):

$$|AD| = \frac{(x_A - x_P)*(x_A - x_B) + (y_A - y_P)*(y_A - y_B) + (z_A - z_P)*(z_A - z_B)}{(x_A - x_B)^2 + (y_A - y_B)^2 + (z_A - z_B)^2}|AB|. \quad (2)$$

Also, because |AC|=0.5*|AB|, the first crystal based distance between the point D and the point C may be expressed as the following formula (3):

$$\rho_{A\_AB} = \quad (3)$$

$$|AD| - |AC| = \left[\frac{(x_A - x_P)*(x_A - x_B) + (y_A - y_P)*(y_A - y_B) + (z_A - z_P)*(z_A - z_B)}{(x_A - x_B)^2 + (y_A - y_B)^2 + (z_A - z_B)^2} - \frac{1}{2}\right]|AB|.$$

The first crystal based distance between the point D and the point C may be transformed into a first crystal based gamma-photon traveling time difference between the point D and the point C. The first crystal based gamma-photon traveling time difference between the point D and the point C may be expressed as the following formula (4):

$$\Delta_{A\_AB} = \quad (4)$$

$$\rho_{A\_AB} * 2/c = 2 * \left[\frac{(x_A - x_P)*(x_A - x_B) + (y_A - y_P)*(y_A - y_B) + (z_A - z_P)*(z_A - z_B)}{(x_A - x_B)^2 + (y_A - y_B)^2 + (z_A - z_B)^2} - \frac{1}{2}\right]|AB|/c.$$

In this example, the description is made by calculating a time calibration amount for the first crystal A, and a time calibration amount for each of other crystals may be calculated by the same method. As shown in the above formulas 2-4, when a gamma-photon travels from an annihilation position to the first crystal A, a traveling distance difference caused by a source position deviation may be calculated based on the first crystal A, and then a gamma-photon traveling time difference may be thereby obtained based on the traveling distance difference and referred to as a first crystal based source time difference of the crystal pair A, B. In this example shown in FIG. 3, the first crystal based source time difference of the crystal pair A, B is calculated.

At step 204, a time difference of the crystal pair is determined according to respective time differences for the crystal pair detecting a plurality of coincidence events; and a pre-calibrated first crystal based time difference of the crystal pair is obtained by pre-calibrating the time difference of the crystal pair with the first crystal based source time difference of the crystal pair.

In an example, an event collection time of the first crystal A in the crystal pair A, B from TOF-PET is calibrated. Moreover, for the crystal pair including the first crystal and the second crystal, when the event collection time of the first crystal and/or the second crystal is to be calibrated, the time difference of the crystal pair is to be determined.

The following describes how to determine the time difference of the crystal pair. It is understood that the crystal pair A, B may detect a plurality of coincidence events. The respective time difference of each of the plurality of coincidence events detected by the crystal pair may be determined. A respective count corresponding to each of the respective time differences for the crystal pair detecting the coincidence events may be determined. A histogram may be generated according to the respective time differences for the crystal pair detecting the coincidence events and the respective counts corresponding to the respective time differences.

Figure 4:
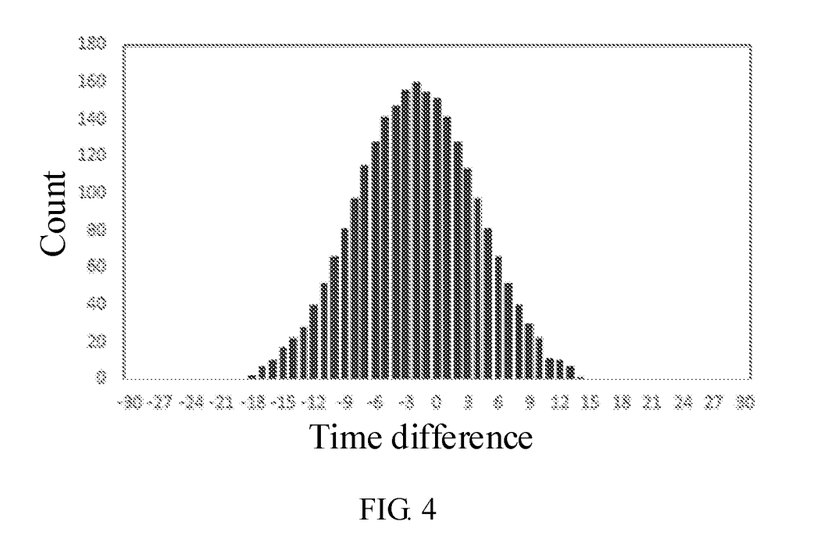
FIG. 4 shows a single-peak histogram according to an example of the present disclosure.

FIG. 4 shows a single-peak histogram according to an example of the present disclosure. The respective time differences are represented along a horizontal axis of the histogram and the counts corresponding to the respective time differences are represented along a vertical axis of the histogram. The peak position of the histogram may be determined by Gaussian function fitting. The time difference corresponding to the peak position of the histogram is determined as the time difference of the crystal pair.

When the phantom is a solid cylinder phantom including a radioactive source or a solid rod source, the peak position of the histogram may be shown in FIG. 4. When the phantom is a cylindrical phantom, the obtained histogram may be a dual-peak histogram. For the dual-peak histogram, two time differences corresponding to the two single peak positions may be calculated first by Gaussian function fitting, and then an average of the two time differences may be then determined as the time difference of the crystal pair, which is represented by $TOF_{A\_AB}$.

In an example, it is determined whether the event collection time of the first crystal is delayed or not relative to an event collection time of the second crystal of the crystal pair according to the phantom image. When the event collection time of the first crystal is delayed, the source time difference of the crystal pair is subtracted from the time difference of the crystal pair to obtain a pre-calibrated first crystal based time difference of the crystal pair. At step 203, the first crystal based source time difference of the crystal pair is obtained. Combined with FIG. 3, since the center D of the radioactive source is at the right side of the center C of the LOR of the crystal pair A, B and is closer to the second crystal B, the event collection time of the first crystal A is actually delayed relative to the event collection time of the second crystal B. The pre-calibrated first crystal based time difference of the crystal pair $\overline{TOF_{A\_AB}}$ may be obtained according to formula 5 below:

$$\overline{TOF_{A\_AB}} = TOF_{A\_AB} - \Delta_{A\_AB} \qquad (5).$$

At step 205, a time calibration amount of the first crystal is obtained based on the pre-calibrated first crystal based time difference of the crystal pair.

A time calibration amount of the first crystal may be obtained by performing an iteration according to a sector of the detector associated with the first crystal. The time calibration amount of the first crystal may be used to calibrate the event collection time of the first crystal.

Figure 5:
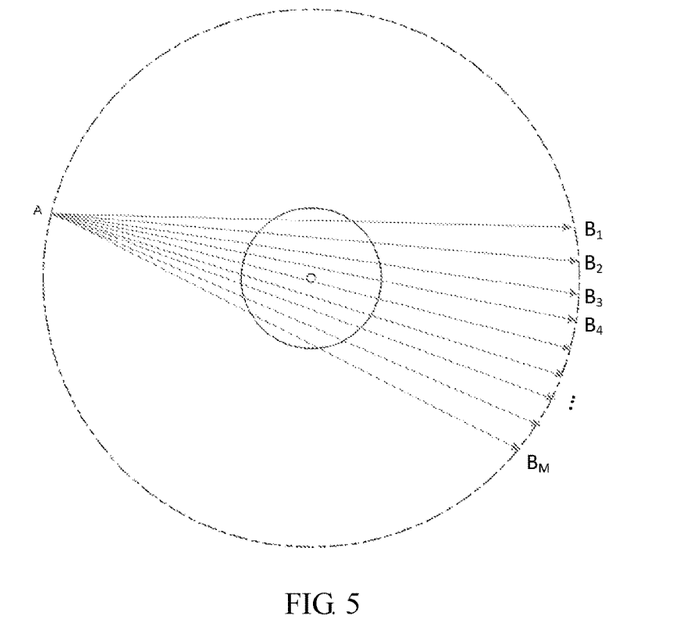
FIG. 5 is a schematic diagram illustrating a crystal-associated sector according to an example of the present disclosure.

FIG. 5 is a schematic diagram illustrating a first crystal-associated sector according to an example of the present disclosure. As shown in FIG. 5, the sector associated with the first crystal A indicates a region of the detector in the PET device on which a plurality of second crystals are located and pairing with the first crystal A for detecting coincidence events. For example, there may be a plurality of second crystals B on the sector which is substantially opposite to the first crystal A as shown in FIG. 5. It is assumed that the second crystals include crystals $B_1$, $B_2$, $B_3$, ..., $B_M$, etc., M representing the number of second crystals in the sector, where the crystal A and the crystal $B_1$ may be a first crystal pair that detects a first plurality of coincidence events, the crystal A and the crystal $B_2$ may be a second crystal pair that detects a second plurality of coincidence events, and the crystal A and the crystal $B_3$ may be a third crystal pair that detects a third plurality of coincidence events. For each of the crystal pairs including the first crystal, a respective pre-calibrated first crystal based time difference of the crystal pair can be obtained, as discussed above. Then the time calibration amount of the first crystal can be obtained based on the respective pre-calibrated first crystal based time differences of the crystal pairs associated with the first crystal.

It is assumed that an initial value $O_{\tau_A}^0$ of the time calibration amount $O_{\tau_A}$ of the first crystal A is 0, and an initial value $TOF_{A\_AB}^0$ of the first crystal based time difference of the crystal pair A, B is the pre-calibrated first crystal based time difference of the crystal pair $\overline{TOF_{A\_AB}}$. An iteration may be performed according to the following formulas 6-8:

$$Bias_A^i = -1n \sum_{B \in FanA} TOF_{A\_AB}^i; \qquad (6)$$

$$O_{\tau_A}^{i+1} = O_{\tau_A}^i + Bias_A^i; \text{ and} \qquad (7)$$

$$TOF_{A\_AB}^{i+1} = TOF_{A\_AB}^i + (Bias_A^i - Bias_B^i). \qquad (8)$$

Where $O_{\tau_A}^i$ indicates a time calibration amount of the first crystal A in i-th iteration; $Bias_A^i$ indicates a first variable in the i-th iteration; $Bias_B^i$ indicates a second variable in the i-th iteration; FanA indicates a sector region associated with the first crystal A; n indicates a number of second crystals pairing with the first crystal A in the associated sector FanA, where n=M; and $TOF_{A\_AB}^i$ indicates a first crystal based time difference of the crystal pair A, B in the i-th iteration; an initial value $TOF_{A\_AB}^0$ of the first crystal based time difference of the crystal pair A, B is the pre-calibrated first crystal based time difference of the crystal pair $TOF_{A\_AB}$ at step 204.

In some examples, as shown in formula 6, the first variable with the first crystal based time difference of the crystal pairs is determined by determining an average of the first crystal based time differences of each of the crystal pairs and determining a negative of the average as the first variable. In some examples, the second variable with a second crystal based time difference of each of the crystal pairs can be determined. An initial value of the second crystal based time difference of each of the crystal pairs is a pre-calibrated second crystal based time difference of each of the crystal pairs. The second variable can be determined by determining an average of the second crystal based time differences of the crystal pairs and determining a negative of the average as the second variable.

The iteration may be terminated when the number of iterations i is up to a preset maximum number of iterations or the first crystal based time difference $TOF_{A\_AB}^{i+1}$ of the crystal pair in an (i+1)-th iteration is below a preset threshold, such as 1. The preset maximum number of iterations can be determined empirically, e.g., based on experience of an operator. In a particular example, the maximum number of iterations is 50.

In an example, it is obtained that the time calibration amount $F_{\tau_A}$ of the first crystal A is $O_{\tau_A}^N$. In other words, the time calibration amount of the first crystal A is obtained by performing N-th iteration. N indicates the preset maximum number of iterations.

At step 206, an event collection time of each of the crystals in the detector is obtained by scanning a subject with the PET device and is calibrated based on the corresponding time calibration amount.

At step 206, in a case that a subject is scanned with the PET device, an event collection time of the first crystal may be obtained and then calibrated based on the time calibration amount $F_{\tau_A}$ obtained at step 205. In an example, the calibrated event collection time of the first crystal A may be a sum of $T_A$ and $F_{\tau_A}$. $T_A$ indicates the event collection time of the first crystal A.

At step 207, coincidence events of the subject are determined based on the calibrated event collection time of each of the crystals, and an image of the subject is reconstructed based on the determined coincidence events of the subject.

In an example, coincidence events of the subject are determined based on the calibrated event collection time of each of the crystals. Then an image of the subject is reconstructed based on the determined coincidence events of the subject.

In addition, in an example, a time calibration table may be established based on the obtained time calibration amount $F_{\tau_A}$ of each of the crystals in the detector of the PET device, where respective values in the table indicate the respective crystals and the time calibration amount corresponding to the respective crystals. When an event collection time of a crystal is obtained by using the PET device to scan a subject, the time calibration amount $F_{\tau_A}$ of the crystal may be obtained by searching the time calibration table and used to calibrate the event collection time of the crystal.

By pre-calibrating a first crystal based time difference for a crystal pair based on a first crystal based source position deviation of the crystal pair, and then a time calibration amount of the first crystal is obtained by performing an iteration according to the pre-calibrated first crystal based time differences of the crystal pairs associated with the first crystal. In this way, the event collection time for the first crystal in the detector of the PET device may be calibrated with a higher accuracy than without calibration.

All the above steps in the flowchart illustrated in FIG. 2 may be performed in any order that is not limited to the order in the flowchart. Besides, the description of each step may be implemented in the form of software, hardware or a combination thereof. For example, a person skilled in the art may implement the description in the form of software code which may be machine-executable instructions of corresponding logic functions for implementing the steps. When implemented in the form of software, the machine-executable instructions may be stored on a machine-readable storage medium for execution by a processor in a device.

Figure 6:
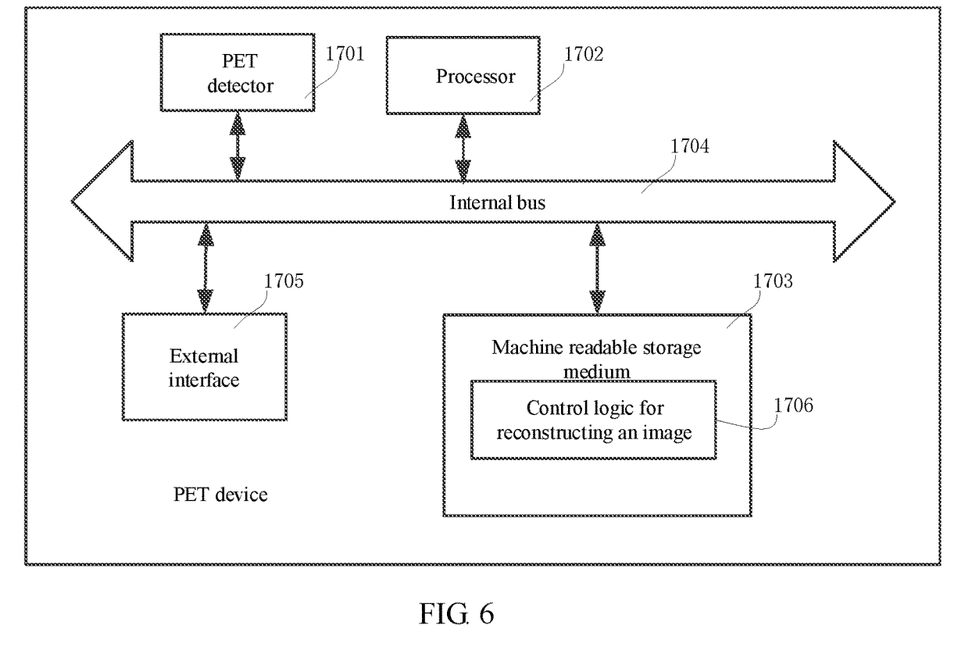
FIG. 6 is a schematic diagram illustrating a hardware structure of a PET device according to an example of the present disclosure.

For example, as shown in FIG. 6, the present disclosure also provides a PET device corresponding to the above method. The device may include a PET detector 1701, a processor 1702, and a machine-readable storage medium 1703. The processor 1702 may be used as the processing unit 103 of FIG. 1. A plurality of crystals are included in the detector and used to detect gamma-photons. The processor 1702 and the machine-readable storage medium 1703 are interconnected by an internal bus 1704. In other possible implementations, the device may further include an external interface 1705 to communicate with other devices or component. Further, a control logic 1706 for reconstructing an image may be stored on the machine-readable storage medium 1703, and the control logic may be functionally divided into a plurality of logic modules. The control logic 1706 may be used as the image reconstructing unit 104 of FIG. 1.

Figure 7:
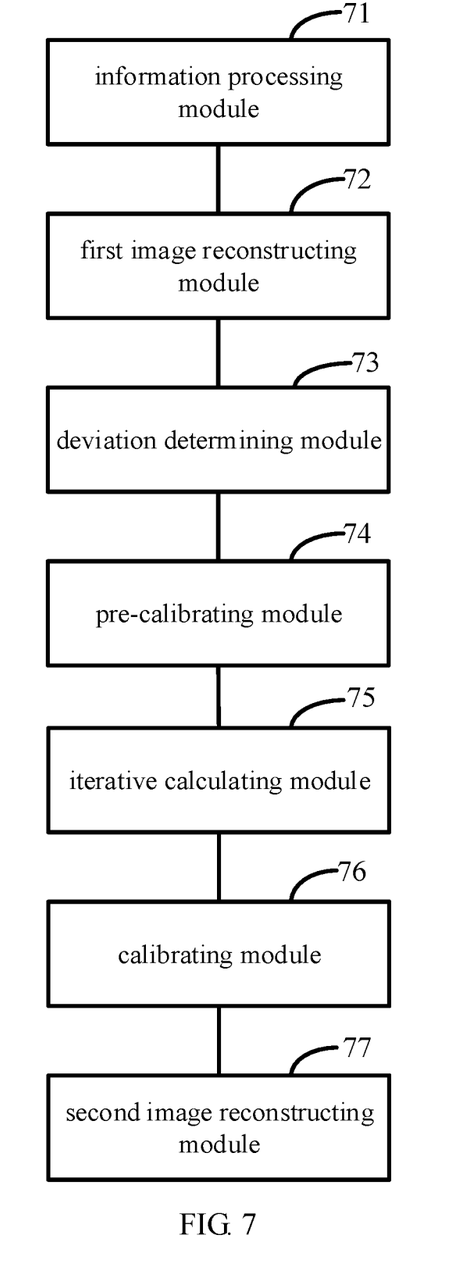
FIG. 7 is a schematic diagram illustrating functional modules of a control logic for reconstructing an image according to an example of the present disclosure.

FIG. 7 is a schematic diagram illustrating functional modules of a control logic 1706 for reconstructing an image according to an example of the present disclosure. As shown in FIG. 7, the control logic 1706 for reconstructing an image may include: an information processing module 71, a first image reconstructing module 72, a deviation determining module 73, a pre-calibrating module 74, an iterative calculating module 75, a calibrating module 76 and a second image reconstructing module 77.

The information processing module 71 is configured to obtain coincidence events detected by crystal pairs in the detector and a time difference for each of the crystal pairs detecting the respective coincidence events, by scanning a phantom placed in the PET device.

The first image reconstructing module 72 is configured to reconstruct a phantom image according to the coincidence events.

The deviation determining module 73 is configured to determine a crystal based source position deviation of a crystal pair including the crystal according to the phantom image and obtain a crystal based source time difference of the crystal pair according to the crystal based source position deviation of the crystal pair. The crystal based source position deviation of the crystal pair indicates a distance between a midpoint of a line-of-response corresponding to the crystal pair and a midpoint of an intersecting segment between the line-of-response and the phantom.

The pre-calibrating module 74 is configured to determine a crystal based time difference of the crystal pair according to the respective time differences for the crystal pair detecting the coincidence events and obtain a pre-calibrated crystal based time difference of the crystal pair by pre-calibrating the crystal based time difference for the crystal pair with the crystal based source time difference of the crystal pair.

The iterative calculating module 75 is configured to obtain a time calibration amount of the crystal according to the pre-calibrated crystal based time differences of the crystal pairs associated with the crystal.

The calibrating module 76 is configured to obtain event collection times of the crystals in the detector by scanning a subject with the PET device and calibrate the event collection time of each of the crystals based on the time calibration amount of each of the crystals. Each of the event collection times indicates a time at which one of the crystals detects a gamma-photon when the subject is scanned.

The second image reconstructing module 77 is configured to determine coincidence events of the subject based on the calibrated event collection time of each of the crystals and reconstruct an image of the subject based on the determined coincidence events of the subject.

In addition, the flow illustrated in FIG. 2 may also be included in the machine-readable storage medium 1703. Machine-readable instructions corresponding to a control logic for reconstructing an image are stored on the medium, and the medium may be connected with the processor 1702. The instructions stored on the medium can be executed by the processor 1702 to implement the above method of reconstructing an image.

Taking software implementation as an example, the following further describes how the processor executes the control logic for reconstructing an image. In this example, the control logic in the present disclosure may be understood as machine-executable instructions stored on the machine-readable storage medium 1703. The processor 1702 in the PET device provided in the present disclosure may execute the above method of reconstructing an image by invoking the machine-executable instructions stored on the machine-readable storage medium 1703.

In the present disclosure, the machine-readable storage medium may be in a variety of forms, such as a Random Access Memory (RAM), a volatile memory, a nonvolatile memory, a flash memory, a storage drive (e.g. hard disk drive), a solid state harddisk, any type of storage disk (e.g., optical disk, Digital Video Disk (DVD)), or a similar storage medium, or a combination thereof, in different examples. In some examples, the machine-readable storage medium may also be paper or other appropriate medium allowing printing of programs thereon. By using these mediums, such programs can be electrically obtained (e.g., optical scanning), can be compiled, interpreted and processed in appropriate manners, and then can be stored on the machine-readable storage medium.

The foregoing examples are merely descriptions of preferred examples of the present disclosure and not intended to limit the present disclosure. Any modifications, equivalent substitutions, adaptations thereof made without departing from the spirit and the scope of the present disclosure shall be encompassed in the claimed scope of the present disclosure.

What is claimed is:

1. A method of reconstructing an image, the method comprising:

obtaining, by scanning a phantom placed in a Positron Emission Computed Tomography (PET) device, coincidence events detected by crystal pairs in a detector of the PET device and respective time differences for the crystal pairs detecting the coincidence events;

reconstructing a phantom image according to the coincidence events detected by the crystal pairs; and for each crystal in the detector, obtaining a time calibration amount of the crystal by determining a crystal based source position deviation of a crystal pair comprising the crystal according to the phantom image, wherein the crystal based source position deviation of the crystal pair represents a distance between a midpoint of a line-of-response corresponding to the crystal pair and a midpoint of an intersecting segment between the line-of-response and the phantom, obtaining a crystal based source time difference of the crystal pair according to the determined crystal based source position deviation of the crystal pair, determining a time difference of the crystal pair according to respective time differences for the crystal pair detecting a plurality of coincidence events, obtaining a pre-calibrated crystal based time difference of the crystal pair by pre-calibrating the time difference of the crystal pair with the crystal based source time difference of the crystal pair, and obtaining the time calibration amount of the crystal according to the pre-calibrated crystal based time difference of the crystal pair.

2. The method of claim 1, wherein pre-calibrating the time difference of the crystal pair with the crystal based source time difference of the crystal pair comprises:

determining whether an event collection time of the crystal is delayed or not according to the phantom image; and in response to determining that the event collection time of the crystal is delayed, subtracting the crystal based source time difference of the crystal pair from the time difference of the crystal pair.

3. The method of claim 1, wherein determining the time difference of the crystal pair according to the respective time differences for the crystal pair detecting the plurality of coincidence events comprises:

determining a respective count corresponding to each of the respective time differences for the crystal pair detecting the plurality of coincidence events;

generating a histogram according to the respective time differences for the crystal pair detecting the plurality of coincidence events and the counts corresponding to the respective time differences, wherein the respective time differences are represented along a horizontal axis of the histogram, and the counts corresponding to the respective time differences are represented along a vertical axis of the histogram; and determining the time difference of the crystal pair according to one or more peak positions of the histogram.

4. The method of claim 3, wherein determining the time difference of the crystal pair according to one or more peak positions of the histogram comprises:

determining an average of time differences corresponding to the one or more peak positions of the histogram; and determining the average of time differences as the time difference of the crystal pair.

5. The method of claim 1, wherein obtaining the time calibration amount of the crystal comprises:

determining M number of second crystals that are located in a sector of the detector associated with the crystal to obtain M number of crystal pairs, the crystal being a first crystal in each of the M number of crystal pairs, wherein M is an integer greater than or equal to 1;

setting an initial value of a time calibration amount of the first crystal to be 0;

determining a first variable with a first crystal based time difference of each of the M crystal pairs, wherein an initial value of the first crystal based time difference of each of the M crystal pairs is a pre-calibrated first crystal based time difference of each of the M crystal pairs;

determining a second variable with a second crystal based time difference of each of the M crystal pairs, wherein an initial value of the second crystal based time difference of each of the M crystal pairs is a pre-calibrated second crystal based time difference of each of the M crystal pairs; and iterating the first crystal based time difference of the crystal pair and the time calibration amount of the first crystal based on the first variable and the second variable.

6. The method of claim 5, wherein determining the first variable with the first crystal based time difference of each of the M crystal pairs comprises:

determining an average of the first crystal based time differences of the M crystal pairs; and determining a negative of the average of the first crystal based time differences as the first variable.

7. The method of claim 5, wherein iterating the first crystal based time difference of the crystal pair and the time calibration amount of the first crystal based on the first variable and the second variable comprises:

determining a difference between the first variable and the second variable that are obtained in an i-th iteration;

generating the first crystal based time difference of the crystal pair in the (i+1)-th iteration by obtaining a sum of the difference and the first crystal based time difference of the crystal pair in the i-th iteration; and generating the time calibration amount of the first crystal in the (i+1)-th iteration by obtaining a sum of the first variable and the time calibration amount of the first crystal that are obtained in the i-th iteration.

8. The method of claim 1, further comprising:

obtaining event collection times of the crystals in the detector by scanning a subject with the PET device, wherein each of the event collection times represents a time at which a respective crystal of the crystals detects a gamma-photon when the subject is scanned;

calibrating the event collection time of each of the crystals based on the time calibration amount of each of the crystals;

determining coincidence events of the subject based on the calibrated event collection times of the crystals; and reconstructing an image of the subject based on the determined coincidence events of the subject.

9. The method of claim 8, wherein calibrating the event collection time of the crystal based on the time calibration amount of the crystal comprises:

generating a time calibration table based on the time calibration amount of each of the crystals in the detector;

obtaining the time calibration amount of the crystal by searching the time calibration table; and calibrating the event collection time of the crystal based on the obtained time calibration amount of the crystal.

10. The method of claim 8, wherein calibrating the event collection time of the crystal based on the time calibration amount of the crystal comprises:

taking a sum of the event collection time of the crystal and the time calibration amount of the crystal as the calibrated event collection time of the crystal.

11. A Positron Emission Computed Tomography (PET) device comprising:

a detector comprising a plurality of crystals, wherein each of the crystals is configured to detect a gamma-photon;

at least one processor; and at least one non-transitory machine-readable storage medium coupled to the at least one processor having machine-executable instructions stored thereon that, when executed by the at least one processor, cause the at least one processor to perform operations comprising:
obtaining, by scanning a phantom placed in a Positron Emission Computed Tomography (PET) device, coincidence events detected by crystal pairs in a detector of the PET device and respective time differences for the crystal pairs detecting the coincidence events;
reconstructing a phantom image according to the coincidence events detected by the crystal pairs;
for each crystal in the detector, obtaining a time calibration amount of the crystal by:
determining a crystal based source position deviation of a crystal pair comprising the crystal according to the phantom image, wherein the crystal based source position deviation of the crystal pair represents a distance between a midpoint of a line-of-response corresponding to the crystal pair and a midpoint of an intersecting segment between the line-of-response and the phantom,
obtaining a crystal based source time difference of the crystal pair according to the determined crystal based source position deviation of the crystal pair,
determining a time difference of the crystal pair according to respective time differences for the crystal pair detecting a plurality of coincidence events,
obtaining a pre-calibrated crystal based time difference of the crystal pair by pre-calibrating the time difference of the crystal pair with the crystal based source time difference of the crystal pair, and
obtaining the time calibration amount of the crystal according to the pre-calibrated crystal based time difference of the crystal pair;
obtaining event collection times of the crystals in the detector by scanning a subject with the PET device, wherein each of the event collection times represents a time at which a respective crystal of the crystals detects a gamma-photon when the subject is scanned;
calibrating the event collection time of each of the crystals based on the time calibration amount of each of the crystals;
determining coincidence events of the subject based on the calibrated event collection times of the crystals; and
reconstructing an image of the subject based on the determined coincidence events of the subject.

12. The PET device of claim 11, wherein pre-calibrating the time difference of the crystal pair with the crystal based source time difference of the crystal pair comprises:
determining whether an event collection time of the crystal is delayed or not according to the phantom image; and
in response to determining that the event collection time of the crystal is delayed, subtracting the crystal based source time difference of the crystal pair from the time difference of the crystal pair.

13. The PET device of claim 11, wherein determining the time difference of the crystal pair according to the respective time differences for the crystal pair detecting the plurality of coincidence events comprises:
determining a respective count corresponding to each of the respective time differences for the crystal pair detecting the plurality of coincidence events;
generating a histogram according to the respective time differences for the crystal pair detecting the plurality of coincidence events and the counts corresponding to the respective time differences, wherein the respective time differences are represented along a horizontal axis of the histogram, and the counts corresponding to the respective time differences are represented along a vertical axis of the histogram; and
determining the time difference of the crystal pair according to one or more peak positions of the histogram.

14. The PET device of claim 13, wherein the operations further comprises:
determining the one or more peak positions of the histogram by Gaussian function fitting.

15. The PET device of claim 13, wherein determining the time difference of the crystal pair according to one or more peak positions of the histogram comprises:
determining an average of time differences corresponding to the one or more peak positions of the histogram; and
determining the average of time differences as the time difference of the crystal pair.

16. The PET device of claim 11, wherein obtaining the time calibration amount of the crystal comprises:
determining M number of second crystals that are located in a sector of the detector associated with the crystal to obtain M number of crystal pairs, the crystal being a first crystal in each of the M number of crystal pairs, wherein M is an integer greater than or equal to 1;
setting an initial value of a time calibration amount of the first crystal to be 0;
determining a first variable with a first crystal based time difference of each of the M crystal pairs, wherein an initial value of the first crystal based time difference of each of the M crystal pairs is a pre-calibrated first crystal based time difference of each of the M crystal pairs;
determining a second variable with a second crystal based time difference of each of the M crystal pairs, wherein an initial value of the second crystal based time difference of each of the M crystal pairs is a pre-calibrated second crystal based time difference of each of the M crystal pairs; and
iterating the first crystal based time difference of the crystal pair and the time calibration amount of the first crystal based on the first variable and the second variable.

17. The PET device of claim 16, wherein determining the first variable with the first crystal based time difference of each of the M crystal pairs comprises:
determining an average of the first crystal based time differences of the M crystal pairs; and
determining a negative of the average of the first crystal based time differences as the first variable.

18. The PET device of claim 16, wherein iterating the first crystal based time difference of the crystal pair and the time calibration amount of the first crystal based on the first variable and the second variable comprises:
determining a difference between the first variable and the second variable that are obtained in an i-th iteration;
generating the first crystal based time difference of the crystal pair in the (i+1)-th iteration by obtaining a sum of the difference and the first crystal based time difference of the crystal pair in the i-th iteration; and
generating the time calibration amount of the first crystal in the (i+1)-th iteration by obtaining a sum of the first variable and the time calibration amount of the first crystal that are obtained in the i-th iteration.

19. The PET device of claim 11, wherein calibrating the event collection time of the crystal based on the time calibration amount of the crystal comprises:
  generating a time calibration table based on the time calibration amount of each of the crystals in the detector;
  obtaining the time calibration amount of the crystal by searching the time calibration table; and
  calibrating the event collection time of the crystal based on the obtained time calibration amount of the crystal.

20. The PET device of claim 11, wherein calibrating the event collection time of the crystal based on the time calibration amount of the crystal comprises:
  taking a sum of the event collection time of the crystal and the time calibration amount of the crystal as the calibrated event collection time of the crystal.

* * * * *